(12) United States Patent
Usami et al.

(10) Patent No.: US 8,148,005 B2
(45) Date of Patent: Apr. 3, 2012

(54) ACTIVE MATERIAL AND A SECONDARY BATTERY USING THE ACTIVE MATERIAL

(75) Inventors: Kyohei Usami, Aichi-ken (JP); Naomi Awano, Nagoya (JP); Atsushi Fukaya, Oobu (JP); Tadashi Sugawara, Tokyo (JP); Michio M. Matsushita, Tokyo (JP); Hideji Komatsu, Tokyo (JP)

(73) Assignees: Denso Corporation, Kariya (JP); The University of Tokyo, Tokyo (JP)

( * ) Notice: Subject to any disclaimer, the term of this patent is extended or adjusted under 35 U.S.C. 154(b) by 1127 days.

(21) Appl. No.: 11/977,480

(22) Filed: Oct. 25, 2007

(65) Prior Publication Data

US 2008/0102374 A1    May 1, 2008

(30) Foreign Application Priority Data

Oct. 27, 2006  (JP) .................................. 2006-292777
Sep. 25, 2007  (JP) .................................. 2007-248139

(51) Int. Cl.
*H01M 6/04*     (2006.01)
*H01G 9/022*    (2006.01)

(52) U.S. Cl. .................. 429/188; 429/347; 252/62.2

(58) Field of Classification Search .................. None
See application file for complete search history.

(56) References Cited

U.S. PATENT DOCUMENTS

| | | | |
|---|---|---|---|
| 4,442,187 A | 4/1984 | MacDiarmid et al. | |
| 4,833,048 A | 5/1989 | Dejonghe et al. | |
| 5,324,599 A | 6/1994 | Oyama et al. | |
| 6,866,964 B2 * | 3/2005 | Nakahara et al. | 429/213 |
| 2005/0170247 A1 | 8/2005 | Nakahara et al. | |

FOREIGN PATENT DOCUMENTS

| | | |
|---|---|---|
| JP | 05-074459 | 3/1993 |
| JP | 2715778 | 2/1998 |
| JP | 2002-151084 | 5/2002 |
| JP | 2004-200059 | 7/2004 |
| JP | 2005-209498 | 8/2005 |
| JP | 2005-228705 | 8/2005 |
| JP | 3687736 | 8/2005 |

* cited by examiner

*Primary Examiner* — Barbara Gilliam
*Assistant Examiner* — Kwang Han
(74) *Attorney, Agent, or Firm* — Harness, Dickey & Pierce, PLC

(57) ABSTRACT

An active material for a secondary battery has excellent large current charge-discharge characteristic and a high energy density. The secondary battery is composed mainly of the active material having a conductive polymer compound represented by formula B or F as the positive electrode. Because this conductive polymer compound works as an active material and has conductivity per se, the use of a conductivity enhancer can be omitted, and the energy density is high. An improvement in the capacity of a secondary battery using the active material above or a decrease in the internal resistance can be realized.

5 Claims, 1 Drawing Sheet

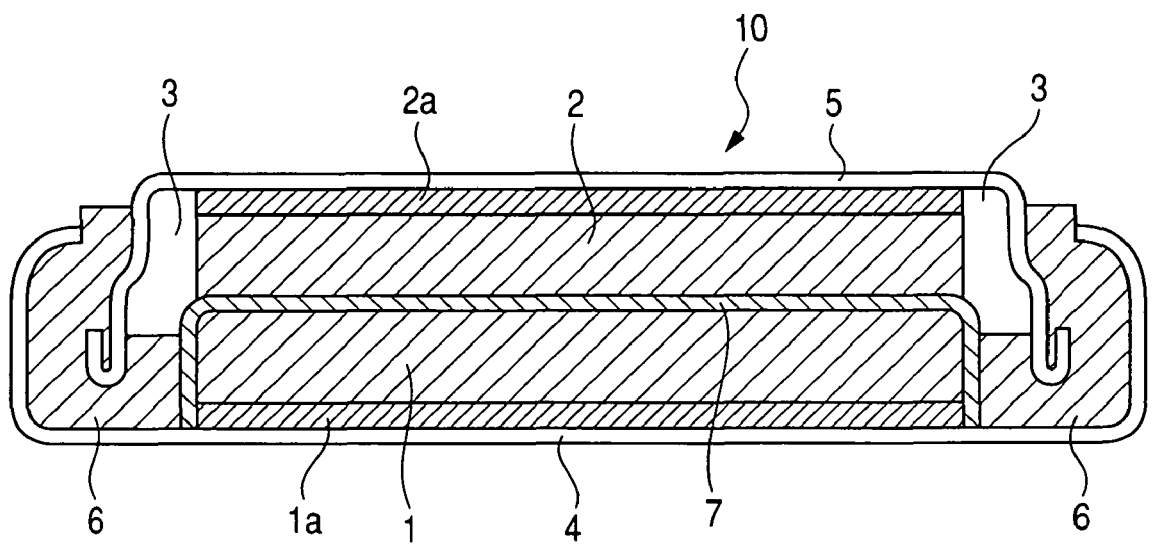

ACTIVE MATERIAL AND A SECONDARY BATTERY USING THE ACTIVE MATERIAL

CROSS-REFERENCE TO RELATED APPLICATION

This application is related to and claims priority from Japanese Patent Applications No. 2006-292777 filed on Oct. 27, 2006, and No. 2007-248139 filed on Sep. 25, 2007, and the contents of which are hereby incorporated by reference.

BACKGROUND OF THE INVENTION

1. Field of the Invention

The present invention relates to an active material for secondary battery, which can realize a secondary battery having excellent large current charge-discharge characteristics as well as a high energy density, and a secondary battery using the active material.

2. Description of the Related Art

As the market for portable electronic instruments such as notebook type personal computers and cellular phones is rapidly increasing, the demand for small-sized large capacity secondary batteries having high energy density, which are used in those electronic instruments, is also increasing. In correspondence to this demand, secondary batteries using an alkali metal ion such as lithium ion as the charge carrier and utilizing an electrochemical reaction associated with the charge exchange of the charge carrier have been developed. Among them, lithium ion secondary batteries are used in various electronic instruments as a large capacity secondary battery having excellent stability and high energy density.

General lithium ion secondary batteries use lithium-containing transition metal oxides as the positive electrode active material, and carbonaceous materials as the negative electrode active material. Charging/discharging is performed using the reactions for insertion and elimination of lithium ions into/from these active materials.

However, since this lithium ion secondary battery uses metal oxides having large specific gravity particularly in the positive electrode, the capacity per unit mass of the secondary battery cannot be said to be sufficient, and attempts to develop high capacity secondary batteries using lighter electrode materials have been examined.

For example, U.S. Pat. No. 4,833,048 or Japanese Patent No. 2715778 discloses a secondary battery which uses an organic compound having disulfide bonds for the positive electrode. This is to use the electrochemical oxidation-reduction reaction involving generation and dissociation of disulfide bonds, as the principle of secondary battery.

Since such secondary batteries are constituted from electrode materials containing those elements having small specific gravity, such as sulfur and carbon, as the main component, the secondary batteries show some effects in terms of providing a large capacity secondary battery with high energy density. However, the efficiency of re-combining the once dissociated bonds is low, and the stability with regard to the state of charge or state of discharge is also insufficient.

Meanwhile, as the secondary batteries using organic compounds likewise, secondary batteries using electrically conductive polymers as the electrode material have been proposed. These batteries are secondary batteries based on the reactions for electrolyte ion doping and dedoping with respect to the conductive polymer.

The doping reaction as described herein means a reaction of stabilizing excitons such as charged solitons or polarons, which are generated by oxidation or reduction of a conductive polymer, by means of couterions. On the other hand, the dedoping reaction corresponds to a reverse reaction thereof, and indicates a reaction for electrochemically oxidizing or reducing the excitons which have been stabilized by couterions.

U.S. Pat. No. 4,442,187 discloses a secondary battery which uses such a conductive polymer as the material for positive electrode or negative electrode. This secondary battery is constituted only of elements having small specific gravities, such as carbon and nitrogen, and is expected to be developed as a high capacity secondary battery.

However, in the conductive polymers, excitons that are generated by oxidation and reduction are widely delocalized over the π-electron conjugate system, and the excitons tend to interact with each other. This interaction poses limits on the concentration of the excitons generated, and thus restricts the capacity of the secondary battery. For this reason, those secondary batteries using conductive polymers as the electrode material show some effects in terms of weight reduction, but are unsatisfactory in terms of having large capacity.

Furthermore, Japanese Patent No. 3687736 discloses a secondary battery which uses a radical compound as the material participating in the electrode reaction. This secondary battery is constituted only of elements having small specific gravities, such as carbon or nitrogen. Also, since reactive unpaired electrons exist localized to radical atoms in the radical compounds, a high capacity secondary battery which allows an increase in the concentration of the reactive site can be expected. Moreover, since only the radical sites contribute to the reaction, there is provided a secondary battery having excellent stability, which has cycle properties that are not dependent on the diffusion of active material, which shows a high oxidation-reduction reaction rate because the oxidation-reduction operation is not accompanied by any change in the polymer skeleton, and in which large current charge-discharge is possible.

Nevertheless, because conventional radical materials are not conductive per se, it is necessary to add large amounts of electrical conductivity enhancers. For example, in the examples of Japanese Patent No. 3687736, powdered graphite in an amount as much as 60 mg is incorporated as a conductivity enhancer, into 30 mg of the radical compound.

Also, in a secondary battery which uses a radical material such as poly(2,2,6,6-tetramethylpiperidinyloxy methacrylate) (PTMA) in the electrode, since the radical material itself does not have any conductivity, a large amount of a conductive material must be added to the radical material during the preparation of the electrode paste, as shown in Japanese Patent laid open publication No. JP 2004-200059. Thus, a secondary battery having excellent output characteristics through securing of the conductivity of electrodes, and having a high energy density, cannot still be obtained.

Therefore, in order to enhance the conductivity of electrodes, various methods have been proposed. In both Japanese patent laid open publications No. JP 2005-228705 and JP 2005-209498, carbon paper was inserted between the positive electrode material and the current collector, to enhance the conductivity. Some effects were observed by this means, but there was a disadvantage that the carbon paper formed a layer of conductive material in addition to the electrode layer containing a large amount of a conventional conductive material, thus lowering the energy density.

SUMMARY OF THE INVENTION

The present invention was completed in consideration of the above-described circumstances, and it is an object of the invention to provide an active material for secondary battery, which can realize a secondary battery having excellent large current charge-discharge characteristics, as well as a high energy density, and a secondary battery using the active material.

Generally in the production of an electrode of a battery, graphite, acetylene black or the like is added to an active material having low conductivity as the conductivity enhancer, thereby reducing the resistance of the electrode. Since radical compounds which participate in the battery reactions also do not themselves have conductivity, conductivity enhancers need to be added during the production of batteries. Accordingly, the amount of active material in the electrode cannot be increased, and batteries having low battery capacities are obtained.

The inventors of the present invention devotedly conducted research in an attempt to solve the related-art problems described above, and as a result, found that addition of a conductivity enhancer can be suppressed or even omitted, by employing a polymer compound in which the conductive site and the stable radical site are integrated, as the active material. By employing this active material, a secondary battery having excellent large current charge-discharge characteristics as well as a high energy density, could be realized.

According to one aspect of the present invention, an active material for secondary battery is (i) characterized in comprising a conductive polymer compound represented by the following general formula (A) or (E); or (ii) characterized in comprising a conductive polymer compound prepared by polymerizing a monomer mixture containing a unit compound represented by the following general formula (C) and/or general formula (D) and/or general formula (G) as the main component, by detaching the hydrogen atoms bound to $C^2$ and $C^5$ of the unit compound; or (iii) characterized in comprising a conductive polymer compound as a copolymer having a partial structure represented by the general formula (A) and/or (E).

With regard to the compound represented by the following general formula (A) or (E), a copolymer having a partial structure represented by the general formula (A) and/or (E), or the compound prepared by polymerizing the unit compounds represented by the general formula (C) and/or general formula (D) and/or general formula (G), conductivity can be realized by the part at which a pyrrole ring and/or a thiophene ring is polymerized. Close to this conductive structure, any of the structures represented by formulas (1) to (4) (the part participating in the battery reactions) is bound. Thus, exchange of electrons that have been generated by the battery reactions can rapidly proceed.

As a result, since the conductive polymer compound contained in the active material for secondary battery according to the present invention, has conductivity per se, it is possible to greatly reduce the amount of a conductivity enhancer to be added, or even omit the addition of a conductivity enhancer, and at the same time, the efficiency of using radicals is enhanced. Thus, it is possible to increase the energy density of a secondary battery.

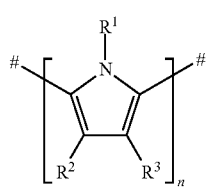
(A)

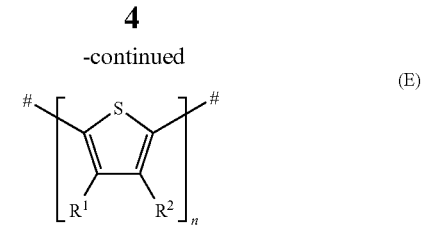
(E)

wherein $R^1$ to $R^3$ in the formulas (A) and (E) are each independently selected from hydrogen and an alkyl group having 1 to 4 carbon atoms, and at least one of $R^1$ to $R^3$ has any of the structures represented by the following general formulas (1) to (4), n is a positive integer and independently selectable.

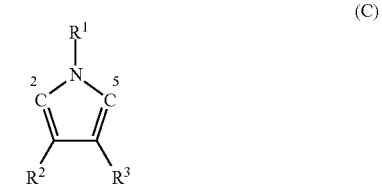
(C)

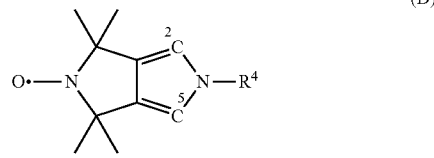
(D)

(G)

wherein $R^1$ to $R^4$ in the formulas (C), (D), and (G) are each independently selected from hydrogen and an alkyl group having 1 to 4 carbon atoms, and at least one of $R^1$ to $R^3$ has any of the structures represented by the following general formulas (1) to (4).

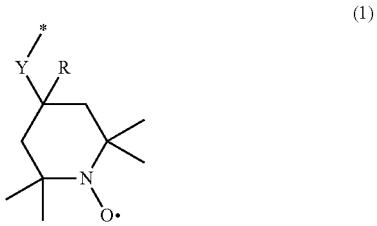
(1)

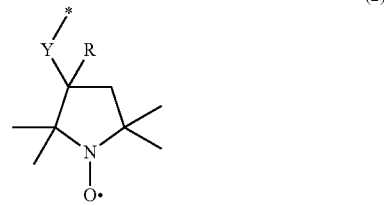
(2)

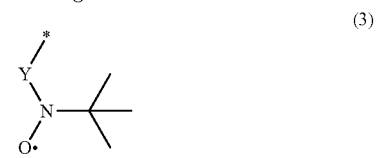
(3)

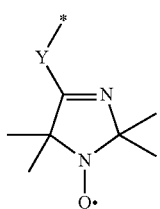

(4)

wherein * represents the position at which the structures of the formulas (1) to (4) respectively bind to a carbon atom or nitrogen atom of the pyrrole ring and/or the thiophene ring in the general formula (A) and (E) described above; R is H, OH, $CH_3$ or $NH_2$; Y is —$(CH_2)_m$— (wherein m is an integer from 0 to 10); and when m is 1 or greater, at least one methylene group which constitutes Y can be substituted by —O—, —NH—, —CH=N—, —S—, —CO—, or any one of the following:

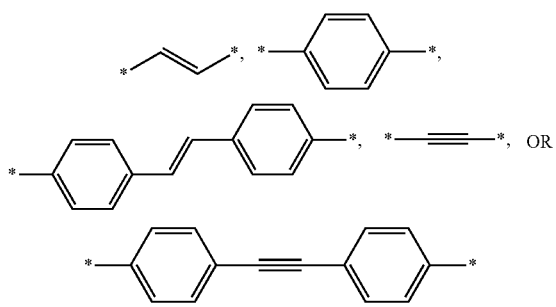

A specifically desirable conductive polymer compound is a compound represented by the following formula (B) and/or (F), or a compound having a partial structure represented by the following formula (B) or (F), or a compound as a copolymer having a partial structure represented by the following formula (B) or (F). In the case of the copolymer, it is possible to have a random copolymer, a block copolymer, and the like as a desirable conductive polymer compound.

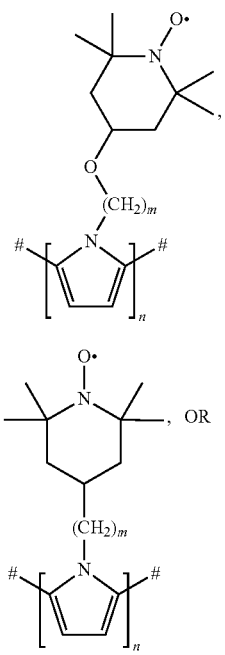

(B)

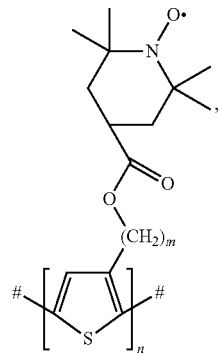

(F)

wherein in the general formulas (B) and (F), m is an integer from 1 to 10, and n is a positive integer which is independently selectable.

Furthermore, with regard to the active material for secondary battery described in (ii), the monomer mixture that can be employed can include pyrrole, pyrrole having at least one hydrogen atom substituted by an alkyl group having 1 to 4 carbon atoms, thiophene, or thiophene having at least one hydrogen atom substituted by an alkyl group having 1 to 4 carbon atoms.

These heterocyclic aromatic compounds can be copolymerized with the unit compound represented by the general formula (C), and/or general formula (D), and/or general formula (G) to form a conductive polymer compound. Therefore, there is a possibility that high conductivity can be realized by means of the adjustment of the amount of addition or the type of the heterocyclic aromatic compound to be added, and the amount of addition or the type can be selected and adjusted so that required performance can be obtained. As the heterocyclic aromatic compound, a compound which can be copolymerized with the unit compound represented by the general formula (C) and/or general formula (D) and/or general formula (G) through detachment of hydrogen atoms, as well as a compound which can form a conjugate system by copolymerizing with a unit compound represented by the general formula (C) and/or general formula (D) and/or general formula (G) can be employed.

According to another aspect of the present invention, a secondary battery is a battery employing the active material for secondary battery described above, as the active material of positive electrode and/or negative electrode. In particular, it is desirable that the active material according to the present invention described above is employed as a positive electrode active material. Further, upon employing the active material as the positive electrode active material, a metal oxide can be incorporated.

The active material for secondary battery according to the present invention is a polymer compound having a radical site at the side chain, and is a compound which manifests conductivity by having a polypyrrole skeleton and/or a polythiophene skeleton in the main chain. In this regard, the active material described in Japanese Patent No. 3687736 employs an insulating main chain which is different from the pyrrole skeleton and/or the polythiophene skeleton, and thus requires a conductivity enhancer. Furthermore, Japanese patent laid open publications No. JP 2005-228705 and JP 2005-209498 disclose a sheet-like composite which comprises a radical polymer and carbon for the purpose of decreasing the internal resistance, and a preferred mass ratio thereof is said to be 60/40 to 80/20.

As the active material for secondary battery according to the present invention confers conductivity per se, the amount of the conductivity enhancer to be added can be reduced or even eliminated. Also, by selecting a polymer as the active material, a binder such as a thermoplastic polymer, which is needed during the preparation of electrodes, can also be reduced, or even eliminated. Thus, it is now possible to increase the ratio of the active material in the electrodes, and a secondary battery having high capacity can be realized.

Therefore, since the site having conductivity and the radical which contributes to the battery reactions can be disposed adjacently, an increase in the efficiency of using the radical or a decrease in the internal resistance can be realized. Furthermore, the part exhibiting conductivity in the main chain can also be subjected to ion doping, and is expected to contribute to battery reactions. Thus, an improvement in the capacity of a secondary battery or a decrease in the internal resistance can be realized.

BRIEF DESCRIPTION OF THE DRAWINGS

A preferred, non-limiting embodiment of the present invention will be described by way of example with reference to the accompanying drawing.

FIGURE is a vertical cross-sectional view schematically showing an exemplary a coin type cell structure of the secondary battery with a non-aqueous electrolyte solution according to the present invention.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the diagram.
(Active Material for Secondary Battery)

The active material for secondary battery of embodiments according to the present embodiment is characterized in comprising:

(i) a conductive polymer compound represented by general formula (A) and/or general formula (E), or (ii) a conductive polymer compound prepared by polymerizing a monomer mixture containing a unit compound represented by general formula (C) and/or general formula (D) and/or general formula (G) as the main component, by detaching the hydrogen atoms bound to $C^2$ and $C^5$ of the unit compound.

The molecular weight or mass of such a conductive polymer compound is in particular not limited. For example, it is possible to use the molecular weight of the conductive polymer compound which is dissolved in a battery and not dissipated into an electrolytic solution in the battery, or becomes a solid in the electrolytic solution in the battery. Specifically, it is desirable to use the molecular weight of conductive polymer compound of not less than 1000. Although "n" in following general formulas is a positive integer, it is desirable to set "n" to a value so that the molecular mass of the conductive polymer compound becomes not less than 1000.

The polymerization reaction performed to obtain the conductive polymer compound of (ii) is not particularly limited, but electrolytic polymerization can be mentioned as an example. Thus, a conductive polymer compound which is soluble in any organic solvent can be produced by a general chemical polymerization method. When a conductive polymer compound which is soluble in organic solvents is prepared, formation of electrodes can be carried out by coating and drying a solution.

Also, in addition to the unit compounds of the general formula (C) and/or general formula (D) and/or general formula (G), a monomer other than them can also be copolymerized. This other monomer that can be copolymerized is not particularly limited, but a compound having a structure which is likely to sufficiently exhibit conductivity in the main chain (for example, pyrrole, pyrrole having at least one hydrogen atom substituted by an alkyl group having 1 to 4 carbon atoms, thiophene, thiophene having at least one hydrogen atom substituted by an alkyl group having 1 to 4 carbon atoms) can be employed. By copolymerizing a monomer other than the unit compounds, affinity to the electrolyte solution or stability can be controlled, namely, suppressed, or conductivity can be controlled, namely, suppressed.

In particular, it is desirable to employ thiophene and/or a thiophene having at least one hydrogen atom substituted by an alkyl group having 1 to 4 carbon atoms (general formula (H): polymerization proceeds, as the hydrogen atoms bound to the carbon atoms at the 2-position and the 5-position are detached. $R^5$ and $R^6$ are each hydrogen or an alkyl group having 1 to 4 carbon atoms).

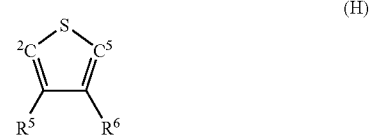

(H)

When these heterocyclic aromatic compounds are employed, a conjugate system can be formed in succession from the pyrrole skeleton, and the conductivity of the main chain can be maintained. As the heterocyclic aromatic compound, a compound which can be copolymerized with the unit compound represented by the general formula (C) and/or general formula (D) and/or general formula (G) by detaching hydrogen atoms, and a compound which can form a conjugate system when copolymerized with the unit compound represented by the general formula (C) and/or general formula (D) and/or general formula (G), can be employed.

In the case of employing, as the other monomer, a compound having a structure which can sufficiently exhibit conductivity as described above, it is desirable that a mixture combining the unit compound of the general formula (C) and/or general formula (D) and/or general formula (G) and the other monomer is present as the main component in the monomer mixture. The mixing ratio of the unit compound of the general formula (C) and/or general formula (D) and/or general formula (G) to the other monomer is not particularly limited but a ratio in the range of about 1:10 to 10:1 can be employed. In particular, the mixture preferably contains the unit compound of the general formula (C) and/or general formula (D) and/or general formula (G) at a ratio of ½ or greater.

Furthermore, since there are also cases where it is possible to maintain the conductivity when the polymer form is selected, such as by choosing a block copolymer (for example, when the unit compound represented by the general formula (C) and/or general formula (I)) and/or general formula (G) has a length to the extent that necessary conductivity can be exhibited), even a monomer which is not likely to have a conjugate double bond also can be used for copolymerization.

The general formula (A) represents a polymer compound having, as the main chain, a pyrrole skeleton formed of polymerized pyrrole rings. The general formula (E) represents a polymer compound having, as the main chain, a thiophene skeleton formed of polymerized thiophene rings. The general formula (C) represents a derivative in which at least one of hydrogen atoms at the 1-position, 3-position and 4-position of the pyrrole ring has been substituted, while the general formula (D) represents a derivative formed from a ring in which hydrogen atoms at the 3-position and 4-position of the pyrrole ring have been substituted. The general formula (G) represents a derivative in which at least one or more hydrogen atoms at the 3-position and 4-position of the thiophene ring has been substituted. Each is a compound which has been polymerized by detaching the hydrogen atoms bound to carbon atoms at the 2-position and 5-position ($C^2$ and $C^5$) of the pyrrole ring and/or the thiophene rings. $R^1$ to $R^3$ are each independently selected from hydrogen and an alkyl group having 1 to 4 carbon atoms, and at least one of $R^1$ to $R^3$ has any of the structures represented by the above-described formulas (1) to (4).

The structures represented by the formulas (1) to (4) have a stable radical structure (stable radical site). That stable radical site is bound to the main chain formed from a pyrrole skeleton and/or a thiophene skeleton through the structure of Y. As the property determined from the structure represented by Y, there can be mentioned that electron transfer occurs between the stable radical site and the main chain having conductivity. This electron transfer is allowed in the case where the transfer occurs within the same molecule, as well as in the case where the transfer occurs between adjacent molecules. Furthermore, it is required that a space of approximately the size through which incoming and outgoing of counterions is allowed (the distance to the adjacent main chain is approximately 10 Å) be secured in a conductive polymer compound. It is also required that the stable radical site is set apart to the extent that the site does not inhibit the polymerization reaction for generating the main chain having a pyrrole skeleton and/or a thiophene skeleton.

Y has a structure in which basically 0 to 10 methylene groups are joined. Here, when there are zero methylene groups, it means that bonding is achieved without anything linked at Y. Thus, Y can be such that any arbitrary methylene group is substituted by —O—, —NH—, —CH=N—, —S—, —CO—, or any of the following:

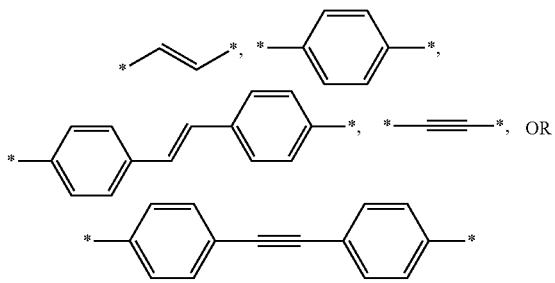

As the preferred conductive polymer compound, compounds having the following structures and compounds represented by the above-described general formula (B) and/or general formula (F) (wherein m is from 0 to 10) can be mentioned as examples, and particularly the compounds represented by the general formula (B) and/or general formula (F) (wherein m is 3 or 6) are preferred. In the following general formulas, n is a positive integer which is independently selectable.

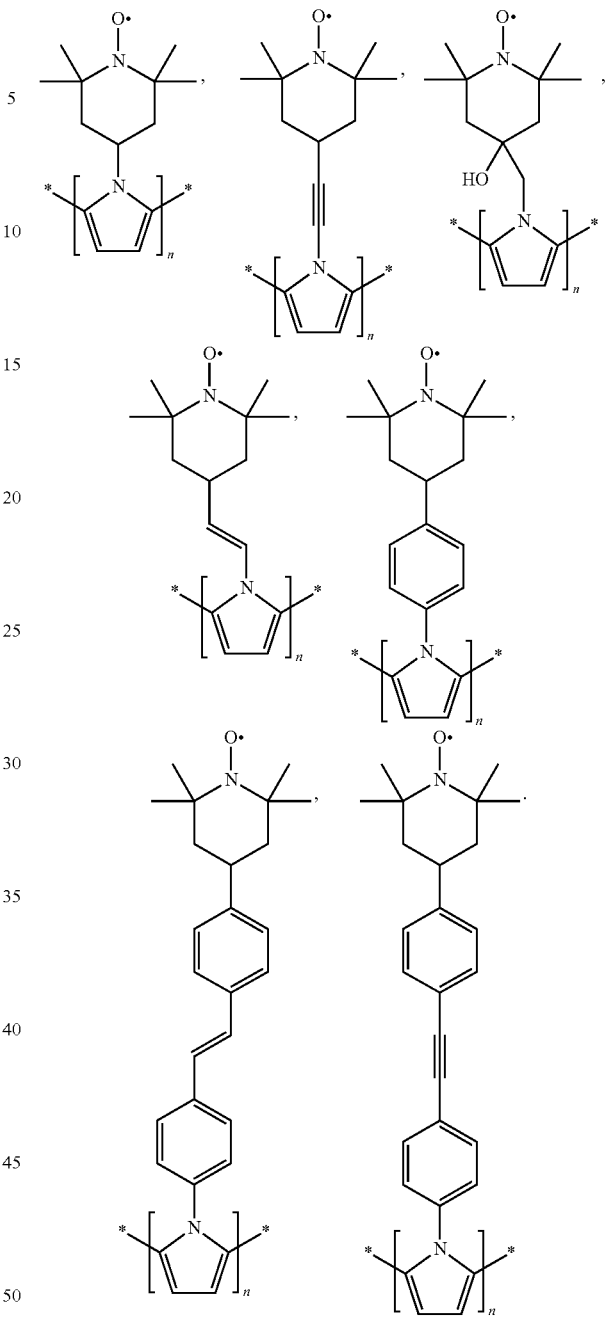

(Secondary Battery)

The secondary battery of the present embodiment has a constitution of employing the above-described active material for secondary battery of the present embodiment in at least one of the positive electrode active material and the negative electrode active material. Specifically, an electrode can be produced by forming a film comprising a conductive polymer compound, on a current collector formed from any conductive material. Also, since the conductive polymer compound is electrically conductive per se, an electrode can be produced only by forming the conductive polymer compound into the film shape, without incorporating any conductivity enhancer. With regard to the method of forming a film, any general method can be employed.

In the case of employing the active material for secondary battery of the present embodiment for one of the electrodes, it is desirable that the active material is employed as the positive electrode active material. In that case, the negative electrode active material is formed using lithium, a lithium alloy, or a material which can occlude and release lithium. The material which can occlude and release lithium can be exemplified by carbonaceous materials such as graphite, cokes, and calcination products of organic polymer compounds. For the positive electrode active material, it is also possible to incorporate a metal oxide such as lithium oxide. The metal oxide can be exemplified by lithium-transition metal complex oxides such as $LiCoO_2$, $LiNiO_2$ and $LiMn_2O_4$.

The secondary battery of the present embodiment consists of, in addition to the positive and negative electrodes, known components, which are easily available, such as a separator which electrically insulates between the two electrodes, a current collector which collects current from the electrode active materials, an electrolyte solution, a battery case, and the like.

The electrolyte solution is a medium for transporting charge carriers such as ions, between the positive electrode and the negative electrode, and is not particularly limited, but a material which is physically, chemically and electrically stable under the atmosphere that the secondary battery is used, is desirable. For example, as a non-aqueous electrolyte solution, an electrolyte solution prepared by taking one or more selected from $LiBF_4$, $LiPF_6$, $LiCF_3SO_3$, $LiN(CF_3SO_2)_2$, $LiN(C_2F_5SO_2)_2$ and $LiN(CF_3SO_2)(C_4F_9SO_2)$ as the supporting electrolyte, and dissolving this in an organic solvent, is preferred. The organic solvent can be exemplified by propylene carbonate, ethylene carbonate, 1,2-dimethoxyethane, dimethyl carbonate, diethyl carbonate, ethyl methyl carbonate, tetrahydrofuran, 2-methyltetrahydrofuran, tetrahydropyrane, or mixtures thereof. Among them, electrolyte solutions containing carbonate-based solvents are preferred in view of high stability at high temperatures. Also, solid polymer electrolytes prepared by incorporating the electrolytes described above into solid polymers such as polyethylene oxide, can also be used.

EXAMPLES (Synthesis of Unit Compound: Compound Represented by the General Formula (B), m=6, PyC6OT)

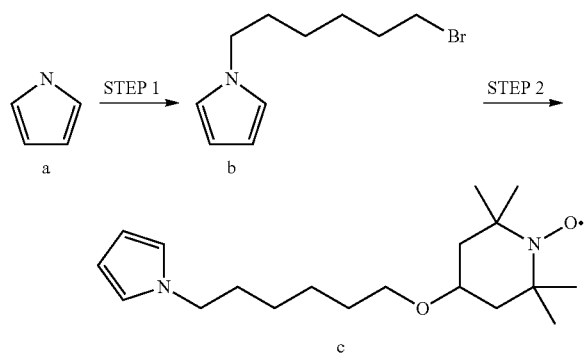

Step 1: Compound a (1H-pyrrole: 0.3 mL, 4.4 mmol), and NaH (60% in oil, 200 mg) washed with hexane were added to 3 mL of DMF, and the mixture was stirred at room temperature for 20 minutes. Subsequently, 1,6-dibromohexane (2 mL, 13.2 mmol) was added dropwise, and the resulting mixture was stirred for 1 hour at room temperature.

The solvent was removed under reduced pressure, then 15 mL of water was added, and the mixture was extracted three times with 20 mL of chloroform. The obtained organic layer was dried over $MgSO_4$, and was purified by column chromatography (developing solvent: hexane-chloroform 3:1), to obtain compound b (1-(6-bromohexyl)-1H-pyrrole). The amount obtained was 681 mg, and the yield was 67%.

Step 2: 4-Hydroxy-TEMPO (4-hydroxy-2,2,6,6-tetramethylpiperidine-1-oxyl: 126 mg, 0.731 mmol) and NaH (60% in oil, 70 mg) washed with hexane were added to 0.5 mL of DMF, and the mixture was stirred at room temperature until bubbles disappeared. Subsequently, the compound b (192 mg, 0.834 mmol) which was obtained in Step 1 and dissolved in 0.5 mL of DMF, was added dropwise, and the resulting mixture was stirred for 17 hour at room temperature.

The solvent was removed under reduced pressure, then 15 mL of water was added, and the mixture was extracted twice with 20 mL of chloroform. The obtained organic layer was dried over $MgSO_4$, and was purified by column chromatography (developing solvent: ethyl acetate-hexane 3:1), to obtain compound c (PyC6OT). The amount obtained was 93 mg, and the yield was 40%.

(Synthesis of Unit Compound: Compound Represented by the General Formula (B), m=3, PyC3OT)

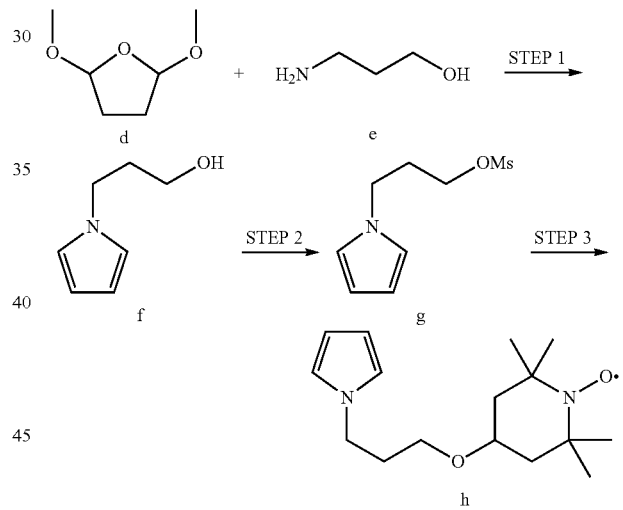

Step 1: While cooling in an ice bath, compound e (3-amino-1-propanol: 18 mL, 0.24 mol) was added to 33 mL of acetic acid, subsequently compound d (2,5-dimethoxytetrahydrofuran: 9 mL, 0.07 mol) was added at once, and the mixture was refluxed for 2 hours. The resultant was allowed to naturally cool to room temperature, then 120 mL of water was added, and the mixture was extracted three times with 50 mL of dichloromethane. The obtained organic layer was dried over $Na_2SO_4$, and the solvent was removed under reduced pressure. 60 mL of methanol and 60 mL of a 20 wt % aqueous solution of NaOH were added to the residue, and the mixture was stirred for 2.5 hours at room temperature. Subsequently, 100 mL of a saturated aqueous solution of NaCl was added, and the mixture was extracted three times with 50 mL of dichloromethane. The obtained organic layer was dried over $Na_2SO_4$, then the solvent was removed under reduced pressure, and the residue was purified by column chromatography (developing solvent: ethyl acetate-hexane 1:1), to obtain compound f (1-(3-hydroxypropyl)-1H-pyrrole). The amount obtained was 4.77 g, and the yield was 54%.

Step 2: In a nitrogen atmosphere, while cooling in an ice bath, the compound f (3.5 g, 0.28 mol) and triethylamine (4.16 mL, 0.30 mol) were added to 25 mL of dichloromethane, subsequently methanesulfonic acid chloride (2.45 mL, 0.30 mol) was added dropwise, and the mixture was stirred for 3 hours at room temperature.

60 mL of water was added, and the mixture was extracted with 60 mL of dichloromethane. The obtained organic layer was washed with 60 mL of a 5 wt % aqueous solution of $NaHCO_3$, and then dried over $Na_2SO_4$, and the solvent was removed under reduced pressure. Subsequently, the residue was purified by column chromatography (developing solvent: chloroform), to obtain compound g (1-(3'-MsO-propyl)-1H-pyrrole). The amount obtained was 5.45 g, and the yield was 96%.

Step 3: In a nitrogen atmosphere, NaH (60% in oil, 0.81 g, 0.203 mol) washed with hexane, and 4-hydroxy-TEMPO (3.5 g, 0.203 mol) were added to 30 mL of DMF, and the mixture was stirred for 1 hour at 0° C. Subsequently, the compound g (5 g, 0.246 mol) was added dropwise, and the mixture was stirred for 15 hours at room temperature. 60 mL of water was added, and the mixture was extracted with 150 mL of hexane. The obtained organic layer was washed 6 times with 25 mL of water, and then dried over $Na_2SO_4$, and the solvent was removed under reduced pressure. Subsequently, the residue was purified by column chromatography (developing solvent: ethyl acetate-hexane 1:3), to obtain compound h (PyC3OT). The amount obtained was 3.28 g, and the yield was 58%.

(Synthesis of Unit Compound: Compound Represented by the General Formula (B), m=2, PyC2OT)

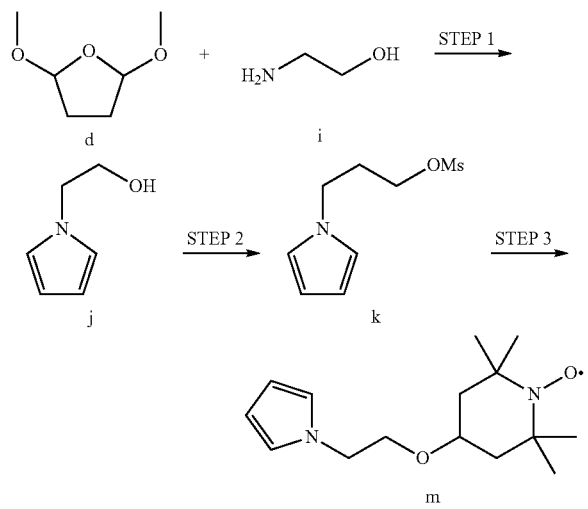

Step 1: While cooling in an ice bath, compound i (2-amino-1-ethanol: 5.6 mL, 94 mmol) was added to 10 mL of acetic acid, subsequently compound d (3 mL, 23 mmol) was added at once, and the mixture was refluxed for 2 hours. The resultant was allowed to naturally cool to room temperature, then 40 mL of water was added, and the mixture was extracted three times with 25 mL of dichloromethane. The obtained organic layer was dried over $Na_2SO_4$, and the solvent was removed under reduced pressure. 20 mL of methanol and 20 mL of a 20 wt % aqueous solution of NaOH were added to the residue, and the mixture was stirred for 2.5 hours at room temperature. Subsequently, 70 mL of a saturated aqueous solution of NaCl was added, and the mixture was extracted two times with 50 mL of dichloromethane. The obtained organic layer was dried over $Na_2SO_4$, then the solvent was removed under reduced pressure, and the residue was purified by column chromatography (developing solvent: ethyl acetate-hexane 1:2), to obtain compound j (1-(2-hydroxyethyl)-1H-pyrrole). The amount obtained was 1.24 g, and the yield was 48%.

Step 2: In a nitrogen atmosphere, while cooling in an ice bath, the compound j (1.0 g, 9 mmol) and triethylamine (1.52 mL, 11 mmol) were added to 15 mL of dichloromethane, subsequently methanesulfonic acid chloride (0.9 mL, 11 mmol) was added dropwise, and the mixture was stirred for 2.5 hours at room temperature.

20 mL of water was added, and the mixture was extracted with 20 mL of dichloromethane. The obtained organic layer was washed with 20 mL of a 5 wt % aqueous solution of $NaHCO_3$, and then dried over $Na_2SO_4$, and the solvent was removed under reduced pressure. Subsequently, the residue was purified by column chromatography (developing solvent: chloroform), to obtain compound k (1-(2-MsO-ethyl)-1H-pyrrole). The amount obtained was 1.60 g, and the yield was 94%.

Step 3: In a nitrogen atmosphere, NaH (60% in oil, 0.16 g, 4 mmol) washed with hexane, and 4-hydroxy-TEMPO (0.69 g, 4 mmol) were added to 5 mL of DMF, and the mixture was stirred for 1 hour at 0° C. Subsequently, the compound k (0.91 g, 4.8 mmol) was added dropwise, and the mixture was stirred for 18 hours at room temperature.

60 mL of dichloromethane was added, and the mixture was washed four times with 50 mL of water. The obtained organic layer was dried over $Na_2SO_4$, and the solvent was removed under reduced pressure. Subsequently, the residue was purified by column chromatography (developing solvent: ethyl acetate-hexane 1:2), to obtain compound m (PyC2OT). The amount obtained was 39 mg, and the yield was 4%.

(Synthesis of Unit Compound: PyT)

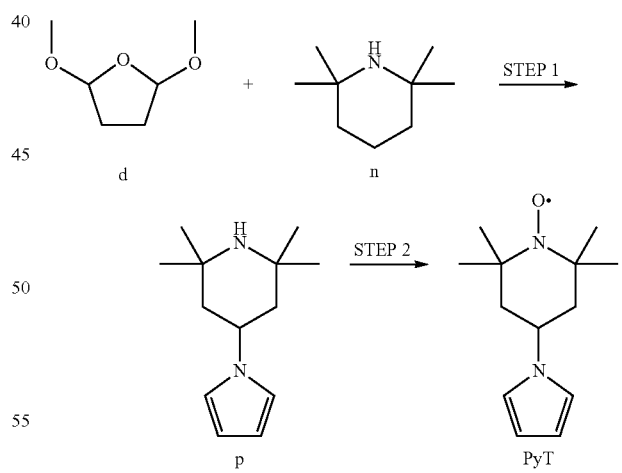

Step 1: While cooling in an ice bath, compound n (4-amino-2,2,6,6-tetramethylpiperidine: 4 ml, 23 mmol) was added to 10 mL of acetic acid, then compound d (1 mL, 7.8 mmol) was added at once, and the mixture was refluxed for 3 hours. After allowing the mixture to naturally cool to room temperature, 40 mL of water was added, and the mixture was extracted twice with 25 mL of dichloromethane. The obtained organic layer was washed with 40 mL of an aqueous solution of $NaHCO_3$, and then dried over $Na_2SO_4$, and the solvent was removed under reduced pressure, to obtain compound p (2,2, 6,6-tetramethyl-4-pyrrol-1-yl-piperidine). The amount obtained was 0.98 g, and the yield was 61%.

Step 2: Compound p (80 mg, 3.9 mmol) was dissolved in 3 mL of THF, and while cooling in an ice bath, a solution prepared by dissolving 3-chloro-peroxybenzoic acid (80 mg, 0.46 mmol) in 2 mL of THF was slowly added dropwise. The mixture was stirred for 3 hours at room temperature, then 40 mL of ether was added, and the mixture was washed three times with 25 mL of a 10 wt % aqueous solution of $NaHCO_3$.

The obtained organic layer was dried over $Na_2SO_4$, and the solvent was removed under reduced pressure. Subsequently, the residue was purified by column chromatography (developing solvent: ethyl acetate-hexane 1:3), to obtain compound PyT. The amount obtained was 19 mg, and the yield was 23%.

(Synthesis of Unit Compound: Compound Represented by the General Formula (F), m=4, Compound u)

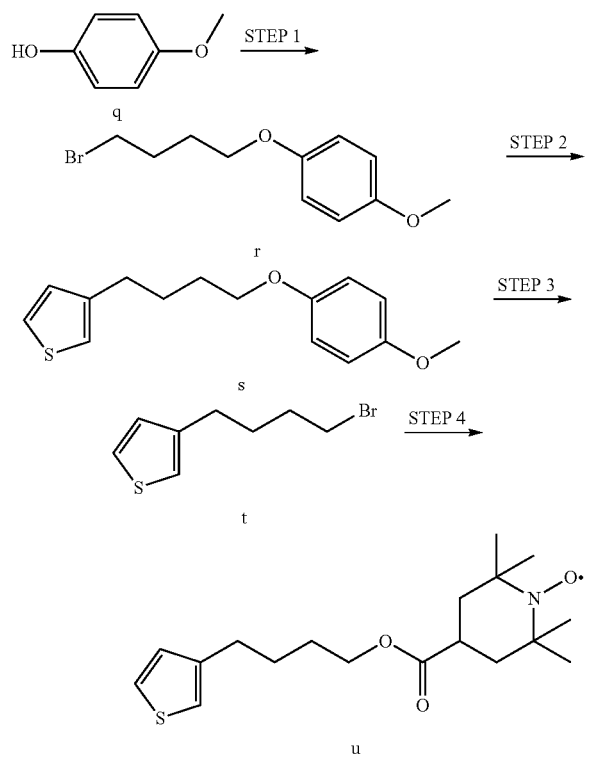

Step 1: 8 mL of methanol solution containing KOH (2.79 g, 49.7 mmol) was added to 4 mL of methanol solution containing compound q (5.11 g, 41.2 mmol), and the mixture solution was stirred. Subsequently, the mixture solution was added dropwise to 15 mL of acetone solution containing 1,6-dibromohexane (8 mL, 67.8 mmol), and was refluxed for 2 hours. 20 mL of $H_2O$ was then added to the mixture solution, and extracted with $CHCl_3$ (20 mL×3). The obtained organic layer was washed with NaOH solution (15 mL×2) and $H_2O$ (20 mL×3). After completion of the washing, the obtained organic layer was dried over $MgSO_4$ and purified by column chromatography (developing solvent: hexane-$CHCl_3$, 2:1), to obtain compound r. The amount obtained was 6.47 g, and the yield was 61%.

Step 2: In a nitrogen atmosphere, 4 mL of ether solution containing compound r (3.22 g, 12.4 mmol) was slowly added to Mg (0.312 g, 12.8 mmol) and 4 mL of ether. The obtained solution was then refluxed for 4 hours. At 0° C., the obtained reaction solution was slowly added to 3-bromothiophene (1 mL, 10.6 mmol), Ni (DPPP), and 10 mg of $Cl_2$, and further 2 mL of ether was added. The obtained solution was then refluxed for 14 hours. 4 mL of 1N—HCl and 15 mL of $H_2O$ were then added to the obtained solution, and extracted with ether (20 mL×3). The obtained organic layer was washed with 20 mL of $H_2O$ and 20 mL of a saturated NaCl solution. The obtained organic layer was dried over $MgSO_4$ and purified by column chromatography (developing solvent: firstly hexane was added, and then $CHCl_3$ gradually added), to obtain compound s. The amount obtained was 1.068 g, and the yield was 39%.

Step 3: In a nitrogen atmosphere, a mixture solution of HBr (47%; 2.3 mL, 20 mmol) and $Ac_2O$ (3.1 mL, 33 mmol) was added to compound s (0.864 g, 3.3 mmol), and heated at 100° C. for 22 hours. Then 10 mL of $H_2O$ was added and an organic layer was then extracted with ether (20 mL×3). The obtained organic layer was washed with 20 mL of $H_2O$ and a saturated $NaHCO_3$ solution (20 mL×3). The obtained organic layer was dried over $MgSO_4$ and purified by column chromatography (developing solvent: hexane) to obtain compound t. The amount obtained was 146 mg, and the yield was 20%.

Step 4: 4-carboxy-TEMPO (100 mg, 0.5 mmol) was dissolved in 8 mL of THF and DBU (0.12 mL, 0.8 mmol) was added. In a nitrogen atmosphere, the obtained suspension was added to compound t (110 mg, 0.5 mmol), and then refluxed for 21 hours. Precipitate in the obtained suspension was separated by filtration, and the solvent was then distilled under a reduced pressure. After 10 mL of ether was added, precipitate generated in the suspension was separated, namely, removed by filtration. The filtered solution was dried over $MgSO_4$ and purified by column chromatography (developing solvent: $CHCl_3$) to obtain compound u. The amount obtained was 119 mg, and the yield was 70%.

(Synthesis of Unit Compound: Compound Represented by the General Formula (F), m=2, Compound x)

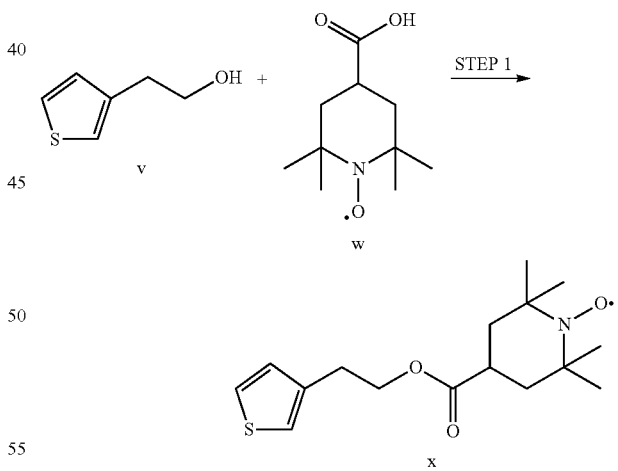

Step 1: The compound v (0.11 mL, 0.98 mmol), the compound w (202 mg, 1.01 mmol), DCC (238 mg, 1.15 mmol), and DMAP (11.3 mg) were solved to 7 mL of dichloromethane, and then was stirred at a room temperature for 2.5 hours. White precipitate in the solution was removed by filtration, and the filtered solution was washed with 0.5 mol of HCl (12 mL×2) and $H_2O$ (12 mL×3). The obtained material was purified by column chromatography (developing solvent: dichloromethane) to obtain compound x. The amount obtained was 212 mg, and the yield was 70%.

(Method for Synthesizing Conductive Polymer Compound)

A monomer mixture containing a unit compound was subjected to polymerization to obtain a conductive polymer compound. The monomer mixture to be polymerized was dissolved in an electrolyte solution prepared using acetonitrile as the solvent and tetrabutylammonium salt as the supporting electrolyte, and polymerization was performed by way of electrolytic polymerization. A three-electrode cell was prepared using a platinum electrode as the working electrode, and using platinum for the counter electrode and silver/silver chloride for the reference electrode. A polymer (conductive polymer compound) was formed on the platinum working electrode by repeating cycles at a sweep rate of 100 mV/s, and a sweep voltage in the range from 0 to 1.6 V.

(Confirmation of Oxidative-Reductive Behavior)

The platinum electrode, on which the synthesis product of the conductive polymer compound synthesized by the method described above was formed on the surface, was used as the working electrode, and metallic lithium was used for the counter electrode and the reference electrode. For the electrolyte solution, a mixed solution containing $LiPF_6$ as the electrolyte salt at a concentration of 1 mol/L in ethylene carbonate and ethyl methyl carbonate (3:7 volume ratio) was used. The produced three-electrode cell was subjected to the measurement of CV.

As a result, an oxidation peak and a reduction peak of radicals appeared at near 3.6 V and 3.5 V, respectively, and it was confirmed that charge-discharge operation was possible without incorporating any conductivity enhancer.

Example 1

Production of Positive Electrode

A monomer mixture containing PyC6OT alone as the unit compound was subjected to electrolytic polymerization by the method described above, and an electrode was produced by forming the conductive polymer compound into a film shape on the surface of platinum.

(Production of Coin Battery)

A coin cell 10 as depicted in FIGURE was produced using the electrode described above as the positive electrode; metallic lithium for the negative electrode; a mixed solution containing $LiPF_6$ as the electrolyte at a concentration of 1 mol/L in ethylene carbonate/ethyl methyl carbonate (3:7 volume ratio), as the electrolyte solution; and a porous membrane made of polyethylene having a thickness of 25 μm as the separator.

As shown in FIGURE, the coin cell 10 consisted of a positive electrode 1, a negative electrode 2, a non-aqueous electrolyte solution 3, a positive electrode case 4 made of stainless steel, a negative electrode case 5 made of stainless steel, a gasket 6 made of polypropylene, and a separator 7 made of polyethylene. The positive electrode 1 and the negative electrode 2 had current collectors 1a and 2a, respectively.

(Evaluation of Cell and Electrodes)

As a result, a good charge-discharge operation was confirmed, and it was judged that the cell was capable of working as a battery, even without a conductivity enhancer. Specifically, the resistivity of the positive electrode in this case was 15.3 Ω·cm.

Second Example

An electrode was prepared in the same manner as in Example 1, except that PyC3OT was used as the unit compound, and a coin cell was produced and tested for the charge-discharge characteristics in the same manner. As a result, a good charge-discharge operation was confirmed, and it was judged that the cell was capable of working as a battery, even without any conductivity enhancer. Specifically, the resistivity of the positive electrode in this case was 14.7 Ω·cm.

Third Example

An electrode was prepared in the same manner as in Example 1, except that monomer mixture containing the compound u and 3-methylthiophene in molar ratio=1:1 was used as the unit compound, and a coin cell was produced and tested for the charge-discharge characteristics in the same manner. As a result, a good charge-discharge operation was also confirmed, and it was judged that the cell was capable of working as a battery, even without any conductivity enhancer. Specifically, the resistivity of the positive electrode in this case was 31.6 Ω·cm.

First Comparative Example

PTMA represented by the following formula, which is a compound similar to chemical formula 6 described in Japanese Patent No. 3687736, was dissolved alone in N-methyl-2-pyrrolidone, and a positive electrode was prepared by coating and drying the solution on aluminum foil. A coin cell was produced, with the components other than the positive electrode being the same as in Example 1, and a charge-discharge test was performed. As a result, the cell did not work, and the charge-discharge operation was not verifiable.

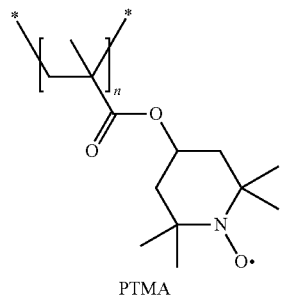

PTMA

Second Comparative Example

A coin cell was produced in the same manner as in Example 1, except that PTMA, carbon black as a conductivity enhancer, and PVDF as a binder were dissolved in N-methyl-2-pyrrolidone at a mass ratio of 55:35:10, and a positive electrode was prepared by coating and drying the solution on aluminum foil as a current collector, and a charge-discharge test was performed. As a result, a charge-discharge operation was confirmed. Specifically, the resistivity of the positive electrode in this case was 26.3 Ω·cm. The resistivity increased up to nearly twice the values of Example 1 and Example 2, whereas the battery capacity per total weight of electrodes was a half or less of the value for the cell of Example 1.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An active material for a secondary battery, wherein the secondary battery has a positive electrode, a negative electrode and an electrolyte as the active material for at least one of the positive electrode and the negative electrode, the active material comprising:
an electrically conductive polymer compound represented by the following general formula (A):

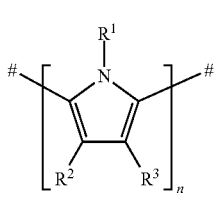

(A)

wherein $R^1$ to $R^3$ in the general formula (A) are each independently selected from hydrogen and an alkyl group having 1 to 4 carbon atoms, and at least one of $R^1$ to $R^3$ has any of the structures represented by the following general formulas (1) to (4):

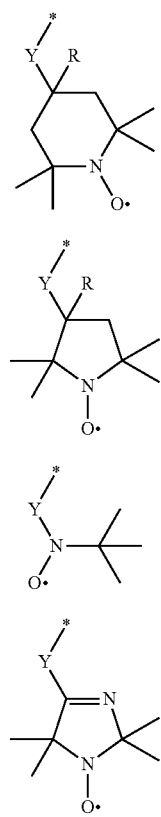

wherein symbol * represents the position at which the structures of the general formulas (1) to (4) respectively bind to a carbon atom or nitrogen atom of the pyrrole ring in the general formula (A); in the general formulas (1) to (4), R is H, OH, CH3 or NH2, Y is —(CH$_2$)$_m$— (wherein m is an integer from 0 to 10); and when m is not less than 1, at least one methylene group which constitutes Y can be substituted by —O—, —CH=N—, —S—, —CO—, or any one of the following:

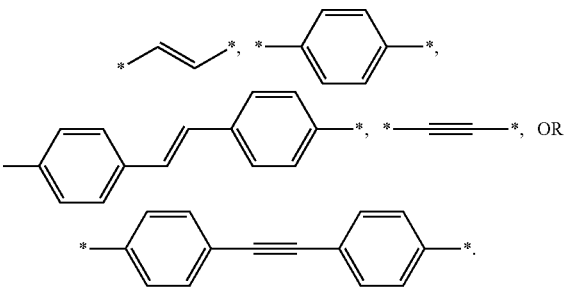

2. The active material for secondary battery according to claim 1, wherein the electrically conductive polymer compound is represented by the following formula (B):

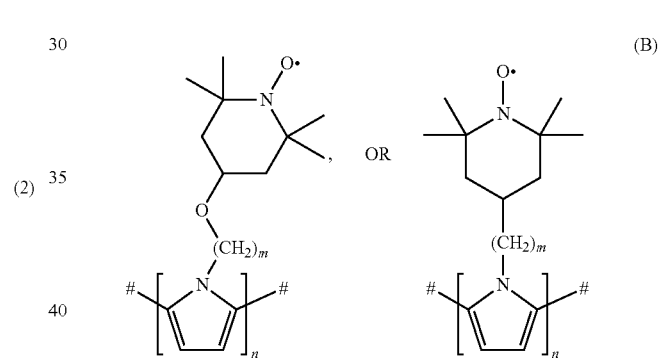

(B)

wherein m is an integer from 1 to 10.

3. The active material for secondary battery according to claim 1, wherein the active material is used for the positive electrode.

4. The active material for secondary battery according to claim 1, further comprising a metal oxide.

5. A secondary battery composed of the positive electrode, the negative electrode and the electrolyte, wherein the active material for at least one of the positive electrode and the negative electrode is the active material for the secondary battery according to claim 1.

* * * * *

UNITED STATES PATENT AND TRADEMARK OFFICE
CERTIFICATE OF CORRECTION

| | | |
|---|---|---|
| PATENT NO. | : 8,148,005 B2 | Page 1 of 1 |
| APPLICATION NO. | : 11/977480 | |
| DATED | : April 3, 2012 | |
| INVENTOR(S) | : Kyohei Usami et al. | |

It is certified that error appears in the above-identified patent and that said Letters Patent is hereby corrected as shown below:

Title Page, (75) Inventors, Kyohei Usami, "Aichi-ken (JP)"
should be -- Inazawa-shi (JP) --

Col. 20, line 5, claim 1, "CH3 or NH2" should be -- $CH_3$ or $NH_2$ --

Signed and Sealed this
Fourteenth Day of August, 2012

David J. Kappos
*Director of the United States Patent and Trademark Office*